United States Patent
Lee

(10) Patent No.: US 12,475,548 B2
(45) Date of Patent: Nov. 18, 2025

(54) METHOD OF DETECTING CUTTING LINE OF DISPLAY APPARATUS

(71) Applicant: SAMSUNG DISPLAY CO., LTD., Yongin-si (KR)

(72) Inventor: Kanghyuk Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 443 days.

(21) Appl. No.: 18/118,207

(22) Filed: Mar. 7, 2023

(65) Prior Publication Data

US 2024/0029230 A1    Jan. 25, 2024

(30) Foreign Application Priority Data

Jul. 19, 2022    (KR) .................. 10-2022-0089032

(51) Int. Cl.
*G06T 7/00*    (2017.01)

(52) U.S. Cl.
CPC .. *G06T 7/0004* (2013.01); *G06T 2207/20021* (2013.01); *G06T 2207/30108* (2013.01); *G06T 2207/30204* (2013.01)

(58) Field of Classification Search
CPC ......... G06T 2207/20021; G06T 7/0004; G06T 2207/30108; G06T 2207/30204; G06T 2207/30121; G06T 7/62; G06T 7/13; G06T 7/0002; H10K 71/70; G01N 21/01; G01N 2021/177
USPC ................................................ 382/100, 141
See application file for complete search history.

(56) References Cited

U.S. PATENT DOCUMENTS

| | | | |
|---|---|---|---|
| 5,710,825 A * | 1/1998 | Suda ................. | G06T 7/13 382/141 |
| 7,271,903 B2 | 9/2007 | Shin et al. | |
| 11,636,620 B2 | 4/2023 | Peng et al. | |
| 2008/0100645 A1 * | 5/2008 | Nitta .............. | G09G 3/3426 345/690 |

(Continued)

FOREIGN PATENT DOCUMENTS

| CN | 112862791 A | | 5/2021 | |
|---|---|---|---|---|
| CN | 114387515 A | * | 4/2022 | ............... G06T 5/30 |

(Continued)

*Primary Examiner* — Sheela C Chawan
(74) *Attorney, Agent, or Firm* — CANTOR COLBURN LLP

(57) ABSTRACT

A method of detecting a cutting line of a display apparatus includes recognizing a reference mark from a captured image of the display apparatus including a first area extending along a boundary of a substrate, a second area positioned on an inner side of the first area, and a background area positioned on an outer side of the first area, designating a measurement area in the captured image to be apart from the reference mark by a preset distance toward the boundary of the substrate, generating a reference line parallel to the boundary of the substrate, within the measurement area, generating detection areas within the measurement area, increasing a difference between grayscale values of pixels constituting the measurement area, determining cutting points in each of the detection areas and detecting the cutting line based on the cutting points, and measuring a distance between the cutting line and the reference mark.

14 Claims, 23 Drawing Sheets

(56) References Cited

U.S. PATENT DOCUMENTS

| | | | |
|---|---|---|---|
| 2008/0204579 A1* | 8/2008 | Masuda | G06T 5/73 |
| | | | 348/254 |
| 2011/0216050 A1 | 9/2011 | Kim et al. | |
| 2012/0212741 A1* | 8/2012 | Chao | G01N 21/958 |
| | | | 356/364 |
| 2017/0169758 A1 | 6/2017 | Park | |
| 2017/0328703 A1* | 11/2017 | Dun | G09G 3/006 |
| 2020/0005691 A1 | 1/2020 | Yoo et al. | |
| 2020/0126203 A1 | 4/2020 | Lee et al. | |
| 2021/0308787 A1 | 10/2021 | Kiefer et al. | |
| 2021/0375189 A1 | 12/2021 | Chun et al. | |

FOREIGN PATENT DOCUMENTS

| | | |
|---|---|---|
| KR | 1020030075087 A | 9/2003 |
| KR | 101141815 B1 | 5/2012 |
| KR | 101432156 B1 | 8/2014 |
| KR | 1020170070299 A | 6/2017 |
| KR | 1020200001658 A | 1/2020 |
| KR | 102241016 B1 | 4/2021 |

* cited by examiner

METHOD OF DETECTING CUTTING LINE OF DISPLAY APPARATUS

This application claims priority to Korean Patent Application No. 10-2022-0089032, filed on Jul. 19, 2022, and all the benefits accruing therefrom under 35 U.S.C. § 119, the content of which in its entirety is herein incorporated by reference.

BACKGROUND

1. Field

One or more embodiments relate to a method of detecting a cutting line of a display apparatus, and more particularly to, a method of detecting a cutting line of a display apparatus, allowing product reliability to be improved.

2. Description of the Related Art

Generally, a display apparatus includes a plurality of pixels that receive an electrical signal to emit light to display an image. Each of the pixels includes a light-emitting element, and for example, an organic light-emitting display apparatus includes an organic light-emitting diode (OLED) as a light-emitting element.

A film member including an optical function film for reducing reflectance of external light and a protective film for protecting a light-emitting element may be coupled to one surface of the display apparatus. The film member may be formed to cover the entire surface of the display apparatus, and then cut by a certain distance inwardly from a boundary of a substrate via a laser cutting process. Afterwards, whether the display apparatus is defective is determined by detecting a cutting line from a captured image of the display apparatus.

SUMMARY

In a conventional method of detecting a cutting line of a display apparatus, a difference between grayscale values of pixels in a boundary portion of a substrate is small, and thus, a detection error of the cutting line may be substantially great.

According to one or more embodiments, a method of detecting a cutting line of a display apparatus includes recognizing a reference mark from a captured image of the display apparatus including a first area extending along a boundary of a substrate of the display apparatus, a second area positioned on an inner side of the first area, and a background area positioned on an outer side of the first area, designating a measurement area in the captured image to be apart from the reference mark by a preset distance toward the boundary of the substrate, generating a reference line parallel to the boundary of the substrate, within the measurement area, generating a plurality of detection areas within the measurement area, increasing a difference between grayscale values of pixels constituting the measurement area, determining cutting points in each of the plurality of detection areas, and detecting the cutting line based on the cutting points, and measuring a distance between the cutting line and the reference mark.

In an embodiment, the generating the reference line may include selecting a pixel matrix of a preset size adjacent to a first boundary between the first area and the background area, extracting grayscale values of respective pixels included in the pixel matrix, selecting a pixel having a value closest to a preset grayscale value from each row of the pixel matrix, and generating the reference line overlapping a column in which a largest number of pixels is selected among columns of the pixel matrix.

In an embodiment, the generating the reference line may include selecting a pixel matrix of a preset size adjacent to a first boundary between the first area and the background area, extracting grayscale values of respective pixels constituting the pixel matrix, calculating an average value of grayscale values of each column of the pixel matrix, and generating the reference line overlapping a column having a lowest average value among columns of the pixel matrix.

In an embodiment, the generating the plurality of detection areas within the measurement area may include determining a width of the plurality of detection areas based on a width of the first area, generating the plurality of detection areas overlapping the first area, within the measurement area, and moving positions of the plurality of detection areas in a way such that an inner side boundary of the plurality of detection areas is apart from the reference line by a preset pixel distance.

In an embodiment, the determining the width of the plurality of detection areas may include extracting grayscale values of respective pixels constituting the measurement area, selecting a first pixel adjacent to a first boundary of the first area and a second pixel adjacent to a second boundary of the first area from among pixels having grayscale values different from a grayscale value of a neighboring pixel by a preset value or more, and determining the width of the detection areas, based on coordinate values of the first pixel and the second pixel.

In an embodiment, the increasing the difference between the grayscale values of the pixels constituting the measurement area may include grouping the pixels constituting the measurement area into a first pixel group having grayscale values less than or equal to a reference value and a second pixel group having grayscale values greater than the reference value, by extracting grayscale values of the respective pixels constituting the measurement area, substituting the grayscale values of the pixels included in the second pixel group, with 255, shifting the respective grayscale values of the pixels included in the first pixel group, and distributing the shifted grayscale values of the pixels included in the first pixel group.

In an embodiment, the shifting the grayscale values of the pixels included in the first pixel group may include adding a shift value to each of the grayscale values of the pixels included in the first pixel group, wherein the shift value may be obtained by subtracting 255 from a largest value among the grayscale values of the pixels included in the first pixel group and adding a first value of 20 or less.

In an embodiment, the distributing the shifted grayscale values of the pixels included in the first pixel group may include substituting each of the shifted grayscale values of the respective pixels included in the first pixel group with a distributed grayscale value satisfying the following equation:

$$G'' = \frac{(N_s - 1)}{(N_p - 1)} \times E,$$

where G" denotes a distributed grayscale value of any one pixel belonging to the first pixel group, $N_s$ denotes a number of pixels having grayscale values less than or equal to the grayscale value of the any one pixel, $N_p$ denotes a total number of the pixels constituting the measurement area, and E may refer to a gain value.

In another embodiment, the distributing of the shifted grayscale values of the pixels included in the first pixel group may include substituting each of the shifted grayscale values of the respective pixels included in the first pixel group with a distributed grayscale value satisfying the following equation:

$$G'' = \left\{ \left[ N_s + \left[ N_s \times \frac{(Ng)}{(N_p - N_g)} \right] - 1 \right] \div [N_P - 1] \right\} \times E,$$

where G" denotes a distributed grayscale value of any one pixel belonging to the first pixel group, $N_s$ denotes a number of pixels having grayscale values less than or equal to the grayscale value of the any one pixel, $N_p$ denotes a total number of the pixels constituting the measurement area, $N_g$ denotes a total number of the pixels belonging to the second pixel group, and E denotes a gain value.

In an embodiment, the determining the cutting points in the respective detection areas and the detecting of the cutting line based on the cutting points may include extracting grayscale values of respective pixels constituting any one detection area among the plurality of detection areas, calculating an average value of grayscale values of pixels constituting a same column within the any one detection area, sequentially calculating a difference between average values of neighboring columns in a direction from an inner side boundary of the any one detection area to an outer side boundary thereof, and determining a cutting point positioned between neighboring columns in which the difference between the average values is less than or equal to a preset score value.

In an embodiment, the cutting line may connect at least two of the selected cutting points in the respective detection areas.

In an embodiment, the cutting line may be parallel to a boundary line of the reference mark.

In an embodiment, the method of detecting the cutting line of the display apparatus may further include restoring a shape of the reference mark, between the increasing of the difference between the grayscale values of the pixels constituting the measurement area and the measuring of the distance between the cutting line and the reference mark.

In an embodiment, the restoring of the shape of the reference mark may include designating a mark area including the reference mark, extracting grayscale values of pixels constituting the mark area, substituting grayscale values of pixels having grayscale values less than or equal to a preset value among the pixels constituting the mark area, with zero (0), and restoring the shape of the reference mark by increasing or decreasing a number of pixels having a grayscale value of zero (0).

Other features of the embodiments of the invention other than those described above will become apparent from the following drawings, claims, and detailed description of the disclosure.

These general and specific features may be practiced by using systems, methods, computer programs, or any combination of systems, methods, and computer programs.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1:
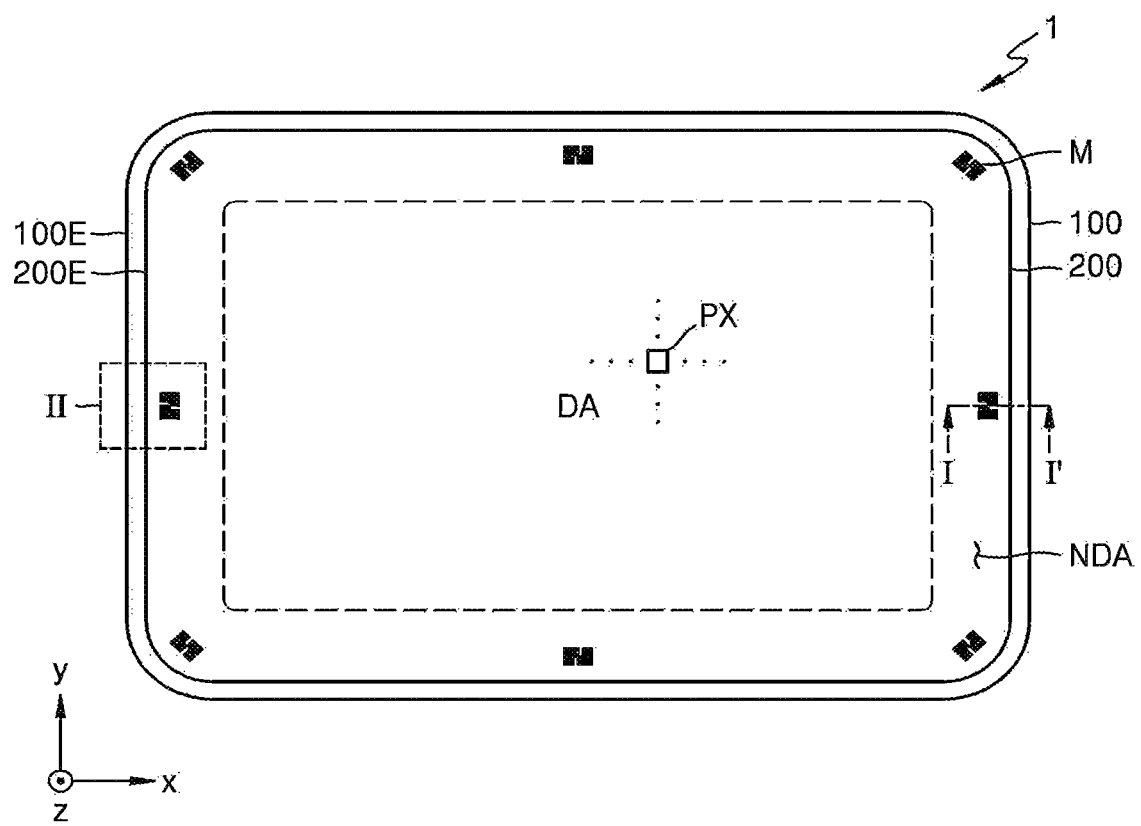
FIG. 1 is a schematic plan view of a display apparatus, for explaining detection of a cutting line according to a method of detecting a cutting line of a display apparatus, according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

"Or" means "and/or." As used herein, the term "and/or" includes any and all combinations of one or more of the associated listed items. Throughout the disclosure, the expression "at least one of a, b or c" or at least one selected from a, b and c" indicates only a, only b, only c, both a and b, both a and c, both b and c, all of a, b, and c, or variations thereof.

Various modifications may be applied to the present embodiments, and particular embodiments will be illustrated in the drawings and described in the detailed description section. The effect and features of the present embodiments, and a method to achieve the same, will be clearer referring to the detailed descriptions below with the drawings. However, the present embodiments may be implemented in various forms, not by being limited to the embodiments presented below.

Hereinafter, embodiments will be described, in detail, with reference to the accompanying drawings, and in the description with reference to the drawings, the same or corresponding components are indicated by the same reference numerals and any repetitive detailed descriptions thereof may be omitted or simplified.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an.".

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

In the present specification, it will be understood that when a layer, region, or component is referred to as being "connected to" another layer, area, or component, it can be directly or indirectly connected to the other layer, region, or component. That is, for example, intervening layers, regions, or components may be present. For example, in the present specification, when a layer, region, or component is electrically connected to another layer, region, or component, the layers, regions, or components may not only be directly electrically connected, but may also be indirectly electrically connected via another layer, region, or component therebetween.

In the present specification, the expression "A and/or B" represents A, B, or A and B. In addition, the expression "at least one of A and B" or "at least one selected from A and B" represents A, B, or A and B.

In the present specification, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

In the present specification, when a certain embodiment may be implemented differently, a specific process order may be performed differently from the described order. For example, two consecutively described processes may be performed substantially at the same time or performed in an order opposite to the described order.

Sizes of components in the drawings may be exaggerated for convenience of explanation. In other words, since sizes and thicknesses of components in the drawings are arbitrarily illustrated for convenience of explanation, the following embodiments are not limited thereto.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
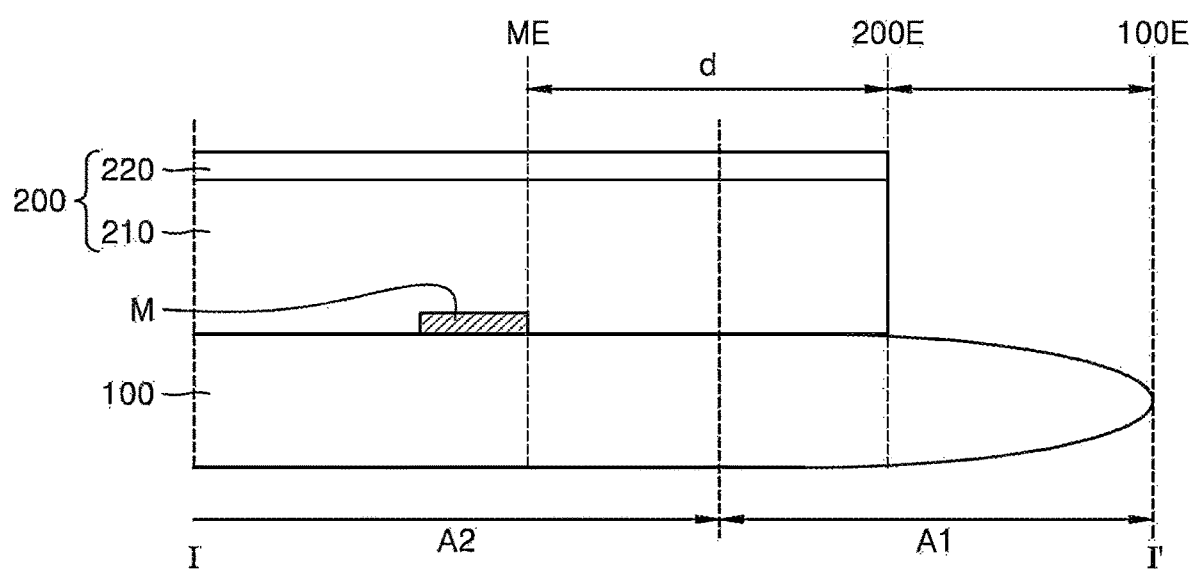
FIG. 2 is a schematic cross-sectional view of the display apparatus shown in FIG. 1 taken along line I-I' of FIG. 1.

FIG. 1 is a schematic plan view of a display apparatus, for explaining detection of a cutting line according to a method of detecting a cutting line of a display apparatus, according to an embodiment, and FIG. 2 is a schematic cross-sectional view of the display apparatus shown in FIG. 1 taken along line I-I' of FIG. 1.

Referring to FIGS. 1 and 2, an embodiment of a display apparatus 1 may include a display area DA in which an image is implemented, and a non-display area NDA in which an image is not implemented. The display apparatus 1 may provide an image to the outside by using light emitted from the display area DA.

FIG. 1 illustrates an embodiment of the display apparatus 1 in which the display area DA is a quadrangle, but in some embodiments, the display area DA may be a circle, an ellipse, or a polygon such as a triangle or a pentagon. Also, an embodiment of the display apparatus 1 of FIG. 1 is a flat display apparatus, but alternatively, the display apparatus 1 may be implemented in various forms, such as a flexible, foldable, or rollable display apparatus.

In an embodiment, the display apparatus 1 may be an organic light-emitting display apparatus. In some embodiments, the display apparatus 1 may be an inorganic light-emitting display apparatus or a quantum dot light-emitting display apparatus. In an embodiment, for example, an emission layer of a display element included in a display apparatus may include an organic material, an inorganic material, a quantum dot, an organic material and a quantum dot, an inorganic material and a quantum dot, or an organic material, an inorganic material, and a quantum dot. Hereinafter, for convenience of description, embodiments where the display apparatus 1 is an organic light-emitting display apparatus will be mainly described in detail.

A plurality of pixels PX may be arranged in the display area DA. The display area DA may display a certain image via light emitted from the pixel PX. The pixel PX in the present specification may be defined as an emission area for emitting light of any one color among red, green, and blue. Herein, the pixels PX may refer to sub-pixels emitting light of different colors, and each of the pixels PX may be, for example, one of a red sub-pixel, a green sub-pixel, and a blue sub-pixel.

The non-display area NDA is where the pixel PX is not arranged and a power supply line for driving the pixel PX may be arranged. In addition, a printed circuit board including a driving circuit unit and a terminal unit to which a driver integrated circuit (IC) is connected may be arranged in the non-display area NDA. The driving circuit unit may also be arranged in the non-display area NDA.

The display apparatus 1 may include a substrate 100. The substrate 100 may provide a base surface on which circuits, wires, and driving circuits for driving the plurality of pixels PX are provided or formed. The substrate 100 may include a glass material, a ceramic material, a metal material, or a flexible or bendable material. In an embodiment where the substrate 100 is flexible or bendable, the substrate 100 may include polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate.

The substrate 100 may have a single-layered or multilayer structure including at least one selected from the materials described above, and may further include an inorganic layer in an embodiment where the substrate 100 has the multilayer structure. In an embodiment, the substrate 100 may have a structure of an organic material/inorganic material/organic material. In an embodiment, the substrate 100 may be chamfered along a boundary 100E of the substrate 100 to prevent or reduce a breakage or crack caused by an external force. A chamfered surface of the substrate 100 may have an increased roughness, and thus, light transmittance may decrease. When an image of the display apparatus 1 is captured by using an image capturing apparatus such as a camera in a direction (for example, a z direction) perpendicular to an upper surface of the substrate 100, the chamfered surface of the substrate 100 may be defined as a first area A1 having lower grayscale values than those of a peripheral area in the captured digital image. In the image, a second area A2 corresponding to a flat surface of the substrate 100 may have higher grayscale values than those of the first area A1.

A film member 200 may be disposed on the substrate 100. The film member 200 may have at least one function selected from various functions according to purposes. In an embodiment, the film member 200 may include an optical functional film 210 for reducing reflectance of light (external light) incident toward the display apparatus 1 from the outside, and/or for improving color purity of light emitted from the display apparatus 1. The optical functional film 210 may be a polarizing film including a retarder and/or a polarizer. In an embodiment, for example, the retarder may include a λ/2 retarder and/or a λ/4 retarder. The film member 200 may include a protective film 220 for protecting the display apparatus 1 from damage caused by an external impact or the like. FIG. 2 illustrates an embodiment of the film member 200 having a multilayer structure in which the protective film 220 is coupled onto the optical functional film 210. Alternatively, the film member 200 may be formed as a single film, and the disclosure is not limited thereto.

The film member 200 may cover the display area DA and portions of the non-display area NDA, and a boundary 200E of the film member 200 may be disposed on the substrate 100. In an embodiment, for example, the boundary 200E of the film member 200 may be apart from the boundary 100E of the substrate 100 by a certain distance, and may be at an inner side of the boundary 100E of the substrate 100. Herein, the inner side of the boundary 100E of the substrate 100 refers to a side close to the display area DA with respect to the boundary 100E of the substrate 100. Hereinafter, in the present specification, the expression "an inner side of A" refers to a side of A close to the display area DA, and the expression "an outer side of A" refers to a side of A far from the display area DA.

The film member 200 may be coupled to the substrate 100 by an adhesive member (not shown). In an embodiment, the adhesive member may be an optically clear adhesive (OCA) or an optically clear resin (OCR).

A reference mark M may be adjacent to the boundary 100E of the substrate 100 and disposed on the substrate 100, as shown in FIGS. 1 and 2. The reference mark M may be arranged in the non-display area NDA. FIG. 1 illustrates an embodiment where eight reference marks M, each of which is at one of four boundaries and four corners of the substrate 100, are provided but the number and shape of the reference mark M may be variously changed or modified as desired. The reference mark M may include a conductive material. In an embodiment, for example, the reference mark M may include a conductive material including molybdenum (Mo), aluminum (Al), copper (Cu), titanium (Ti), and the like, and may be a multilayer or single layer, each layer including at least one selected from the above materials.

The boundary 200E of the film member 200 may be cut by a laser irradiation apparatus. In an embodiment, for example, when a laser beam cuts the film member 200 along a certain cutting line CL (see FIG. 14), the cutting line CL of the laser beam and the boundary 200E of the film member 200 may correspond to each other. Herein, the cutting line CL refers to the boundary 200E of the film member 200.

The laser irradiation apparatus may be an excimer laser irradiation apparatus having a short wavelength of about 308 nanometers (nm). In some embodiments, the laser irradiation apparatus may be a $CO_2$ laser, a YAG laser, a nano second laser, a femto second laser, a Bessel beam irradiation apparatus, or a Gaussian beam irradiation apparatus.

When the film member 200 is cut by the laser irradiation apparatus, an area adjacent to the boundary 200E of the film member 200 may turn black due to heat. When an image of the display apparatus 1 is captured by using an image capturing apparatus such as a camera in a direction (for example, a z-axis direction) perpendicular to an upper surface of the substrate 100, image pixels constituting an area adjacent to the boundary 200E of the film member 200 may have lower grayscale values than those of image pixels constituting a peripheral area in the captured digital image. Therefore, the cutting line CL may be detected by using a difference between grayscale values of pixels constituting the area turned black by the heat and neighboring pixels, but as shown in FIG. 2, when the boundary 200E of the film member 200 overlaps the first area A1, the difference between the grayscale values of the pixels constituting the area turned black by the heat and the neighboring pixels may be small.

Figure 3:
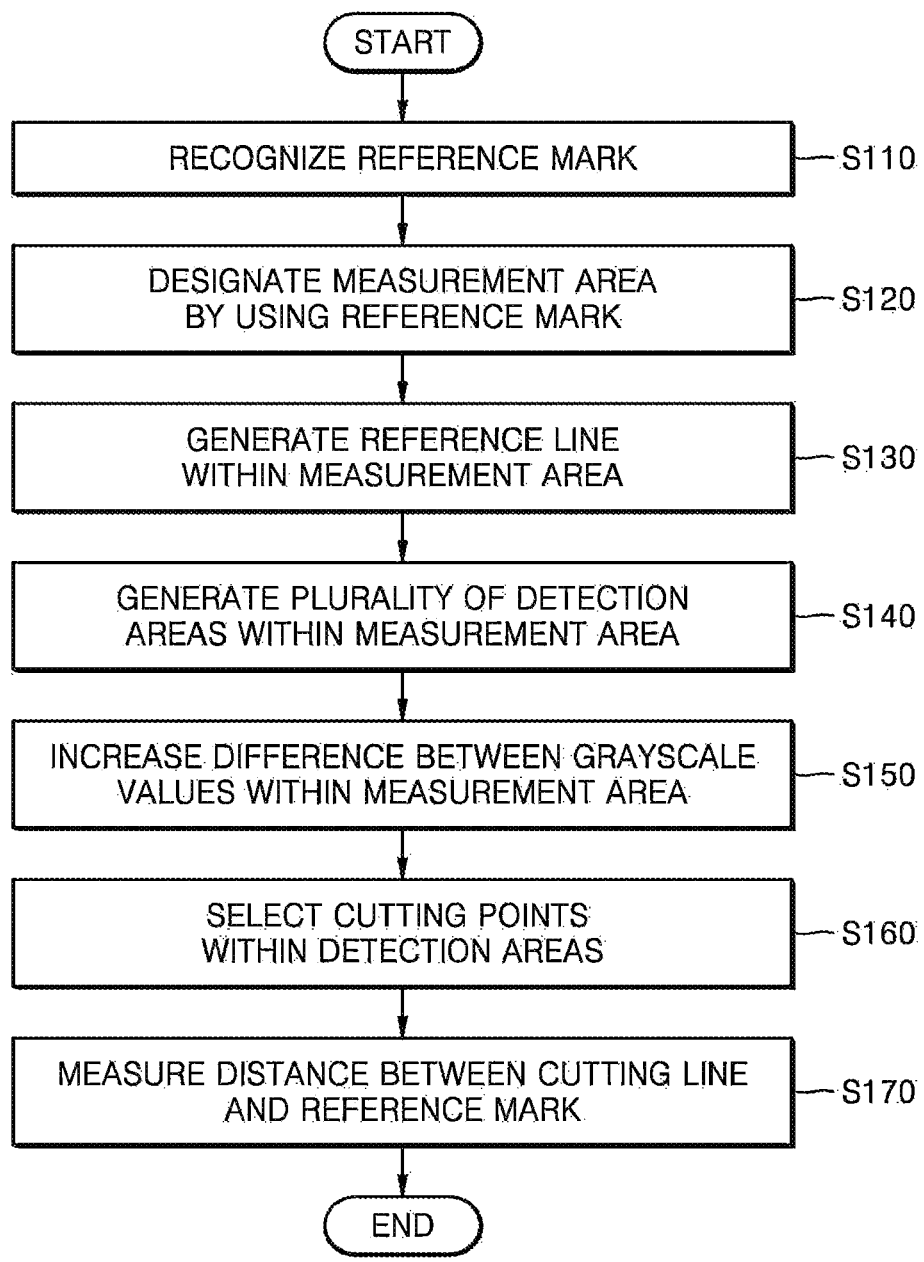
FIG. 3 is a schematic flowchart for explaining each operation of a method of detecting a cutting line of a display apparatus, according to an embodiment.

FIG. 3 is a schematic flowchart for explaining each operation of a method of detecting the cutting line CL of a display apparatus, according to an embodiment.

Referring to FIG. 3, a method of detecting the cutting line CL of the display apparatus 1 according to an embodiment may include recognizing the reference mark M from a digital image obtained by capturing an image of the display apparatus 1 (operation S110), designating a measurement area IA (shown in FIG. 5) by using the reference mark M (operation S120), generating a reference line BL (shown in FIG. 6B) within the measurement area IA (operation S130), generating a plurality of detection areas RoI within the measurement area IA (operation S140), increasing a difference between grayscale values of pixels constituting the measurement area IA (operation S150), selecting cutting points within the respective detection areas RoI (shown in FIG. 8B) (operation S160), and measuring a distance d between the cutting line CL (shown in FIG. 14) and the reference mark M (operation S170). Each operation may be performed by a detection apparatus.

In an embodiment, the detection apparatus performing the method of detecting the cutting line of the display apparatus 1 may include a computing apparatus. Herein, the computing apparatus may include at least one processor and memory. In addition, the detection apparatus may further include an image capturing apparatus for capturing an image of the display apparatus 1.

Hereinafter, referring to FIGS. 4 to 15D, each operation of the method of detecting the cutting line of the display apparatus 1 according to an embodiment will be described in detail.

Figure 4:
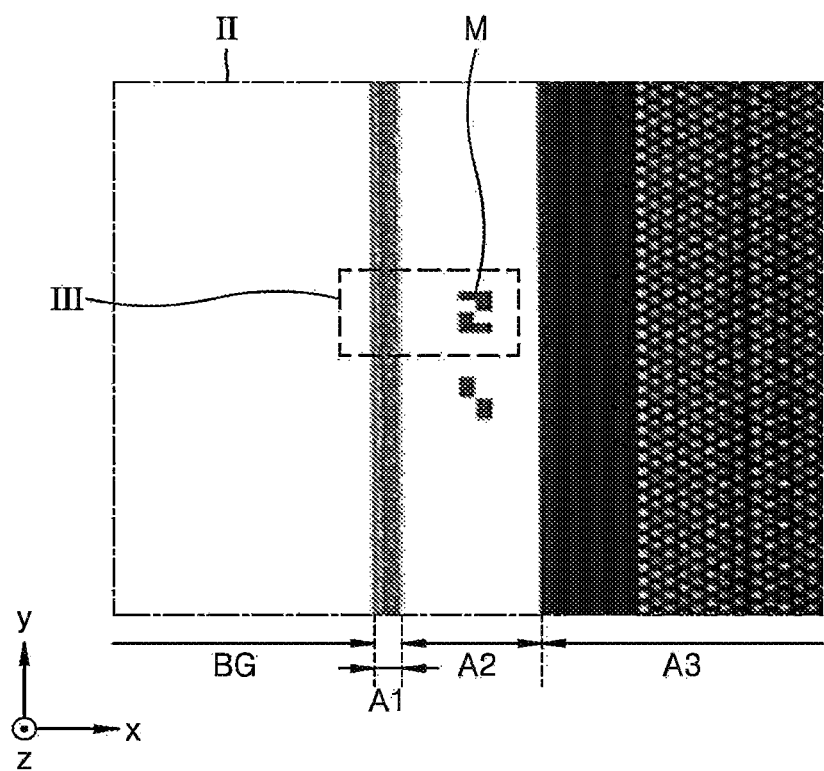
FIG. 4 is a diagram for explaining a method of recognizing a reference mark, according to an embodiment.

FIG. 4 is a diagram for explaining a method of recognizing a reference mark, according to an embodiment. FIG. 4 may be a digital image corresponding to an area II of the display apparatus 1 shown in FIG. 1.

Referring to FIG. 4, the reference mark M may be recognized from a digital image of the display apparatus 1 captured by using an image capturing apparatus such as a camera in a direction (for example, a z direction) perpendicular to an upper surface of the substrate 100.

The digital image may have information in units of image pixels (hereinafter, will be referred to as pixels) in a grid shape. Each pixel of the digital image may have a grayscale value. The digital image may include pixels corresponding to each of the first area A1 extending along the boundary 100E of the substrate 100, the second area A2 positioned on an inner side of the first area A1, and a background area BG positioned on an outer side of the first area A1.

The first area A1 may extend along the boundary 100E of the substrate 100. FIG. 4 illustrates an embodiment where the first area A1 extends in a y-axis direction. As described above, the first area A1 may be an area corresponding to a chamfered surface of the substrate 100. The chamfered surface of the substrate 100 has a low light transmittance, and thus, the first area A1 may have lower grayscale values than those of the background area BG and the second area A2. The cutting line CL may be positioned in the first area A1.

The background area BG and the second area A2 may be arranged with the first area A1 therebetween. The second area A2 is an area corresponding to a flat surface of the substrate 100, and the reference mark M may be positioned in the second area A2. The first area A1 and the second area A2 may correspond to the non-display area NDA of the display apparatus 1.

The background area BG is an area outside the boundary 100E of the substrate 100, and the pixels constituting the background area BG may have high grayscale values. In an embodiment, when an image of the display apparatus 1 is captured, the background area BG may be an area corresponding to a support portion supporting the display apparatus 1.

The digital image may further include a third area A3 in which a component of the display apparatus 1, such as a wire, is arranged. Components of the display apparatus 1 reduce light transmittance, and thus, the third area A3 may have lower grayscale values than those of the second area A2.

The reference mark M may be recognized from the digital image by using the shape and position of the stored reference mark M.

Figure 5:
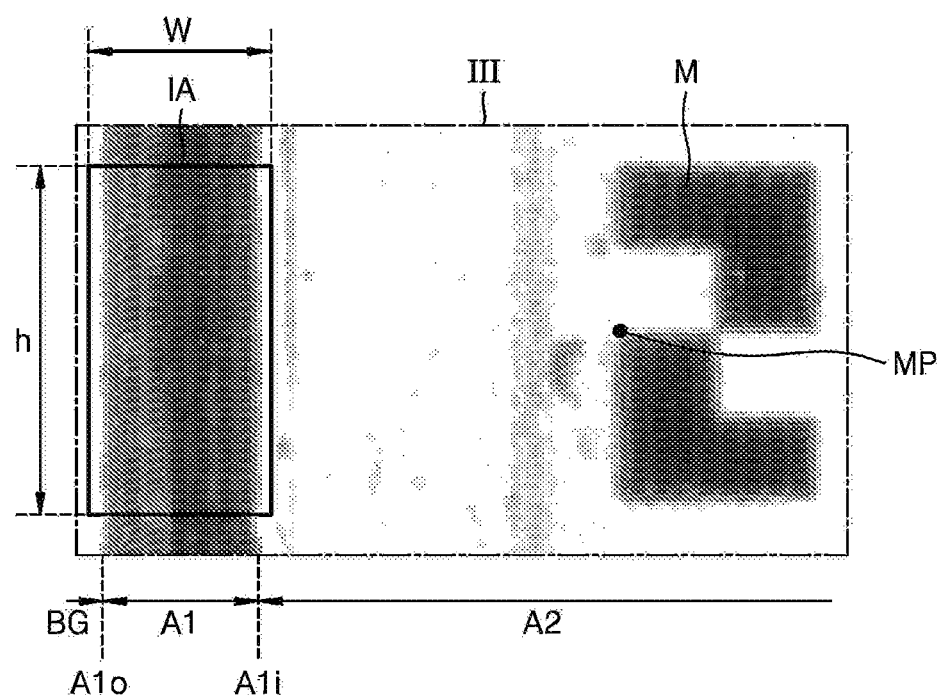
FIG. 5 is a diagram for explaining a method of designating a measurement area, according to an embodiment.

FIG. 5 is a diagram for explaining a method of designating a measurement area, according to an embodiment. FIG. 5 may be an enlarged view of an area III of the digital image of the display apparatus 1 shown in FIG. 4.

Referring to FIG. 5, the measurement area IA apart from a reference point MP of the reference mark M by a preset distance toward the boundary 100E of the substrate 100 may be designated in the digital image.

The preset distance, which is a distance between the reference point MP of the reference mark M and the measurement area IA, may be set in consideration of a design value of a distance between the reference mark M and the cutting line CL, an error due to a cutting process, and a magnification of a digital image.

In an embodiment, a width W and a height h of the measurement area IA may have a preset value. Alternatively, the width W and/or the height h of the measurement area IA may be set by a user. The measurement area IA may have a sufficient width W to include a first boundary A1o and a second boundary A1i.

Herein, the first boundary A1o and the second boundary A1i that are boundaries of opposing sides of the first area A1, may be automatically generated by an algorithm of the detection apparatus. In an embodiment, for example, when a difference between grayscale values of any one pixel and a pixel adjacent to the any one pixel in a −x direction is less than or equal to a negative reference value, the first boundary A1o between the two pixels may be generated. In such an embodiment, when a difference between grayscale values of any one pixel and a pixel adjacent to the any one pixel in a −x direction is greater than or equal to a positive reference value, the second boundary A1i between the two pixels may be generated. In such an embodiment, the boundary 100E of the substrate 100 may approximately correspond to the first boundary A1o.

Figure 6A:
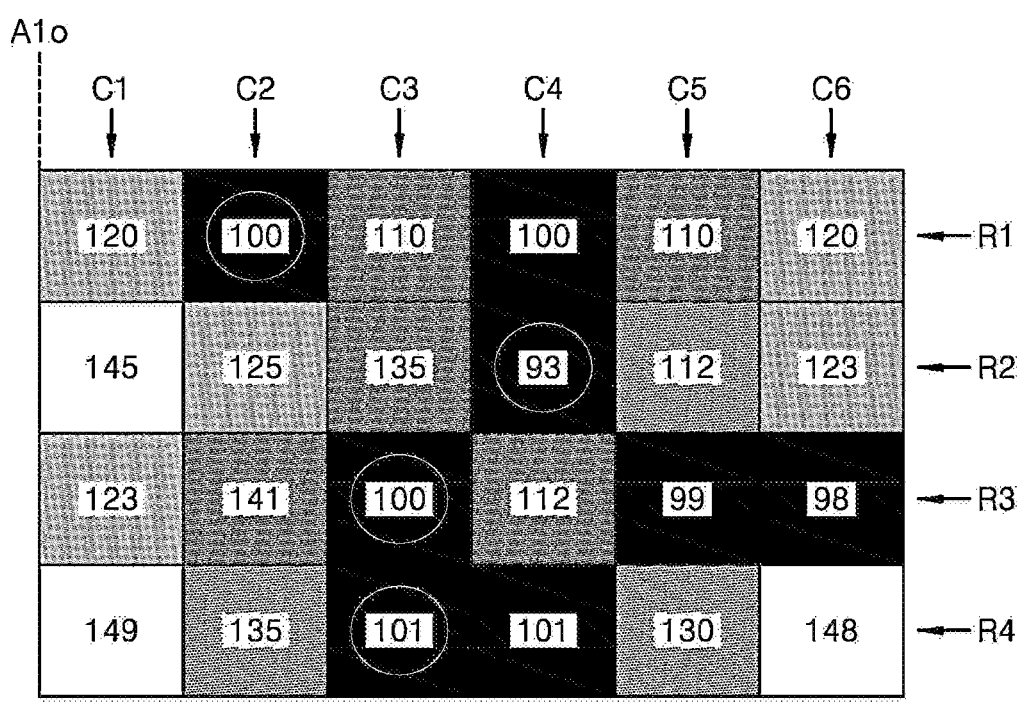
FIGS. 6A and 6B are diagrams for explaining a method of generating a reference line, according to an embodiment.
Figure 6B:
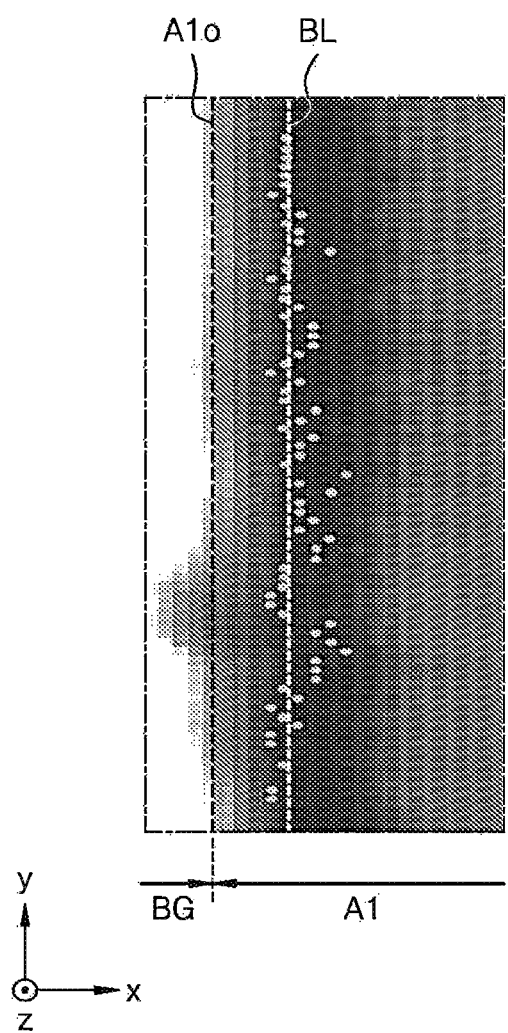

FIGS. 6A and 6B are diagrams for explaining a method of generating a reference line, according to an embodiment.

Referring to FIGS. 6A and 6B, the reference line BL parallel to the boundary 100E of the substrate 100 may be generated in the measurement area IA.

First, a preset number of pixels adjacent to the first boundary A1o between the first area A1 and the background area BG may be selected. FIG. 6A illustrates an embodiment where a 4×6 pixel matrix adjacent to the first boundary A1o is selected. A column of the pixel matrix may be parallel to the first boundary A1o. Herein, the number of rows and columns of the pixel matrix is not limited thereto, and as shown in FIG. 6B, the number thereof may be variously modified or changed as desired.

Grayscale values of respective pixels constituting the pixel matrix are extracted, and a pixel having a value closest to a preset grayscale value in each row may be selected. When the preset grayscale value is 0, the darkest pixel among pixels constituting each row may be selected.

In an embodiment, for example, as shown in FIG. 6A, a (1,2) pixel may be selected in a first row of the pixel matrix, a (2,4) pixel may be selected in a second row, a (3,3) pixel may be selected in a third row, and a (4,3) pixel may be selected in a fourth row.

In an embodiment, the reference line BL may be generated to overlap a column, in which the largest number of pixels are selected, among the columns of the pixel matrix. In an embodiment, for example, as shown in FIG. 6A, the reference line BL may be generated to overlap a third column in which the (3,3) pixel and the (4,3) pixel are selected. FIG. 6B illustrates an embodiment where points positioned in the first area A1 indicate selected pixels, and the reference line BL is generated to overlap the largest number of points.

Figure 7:
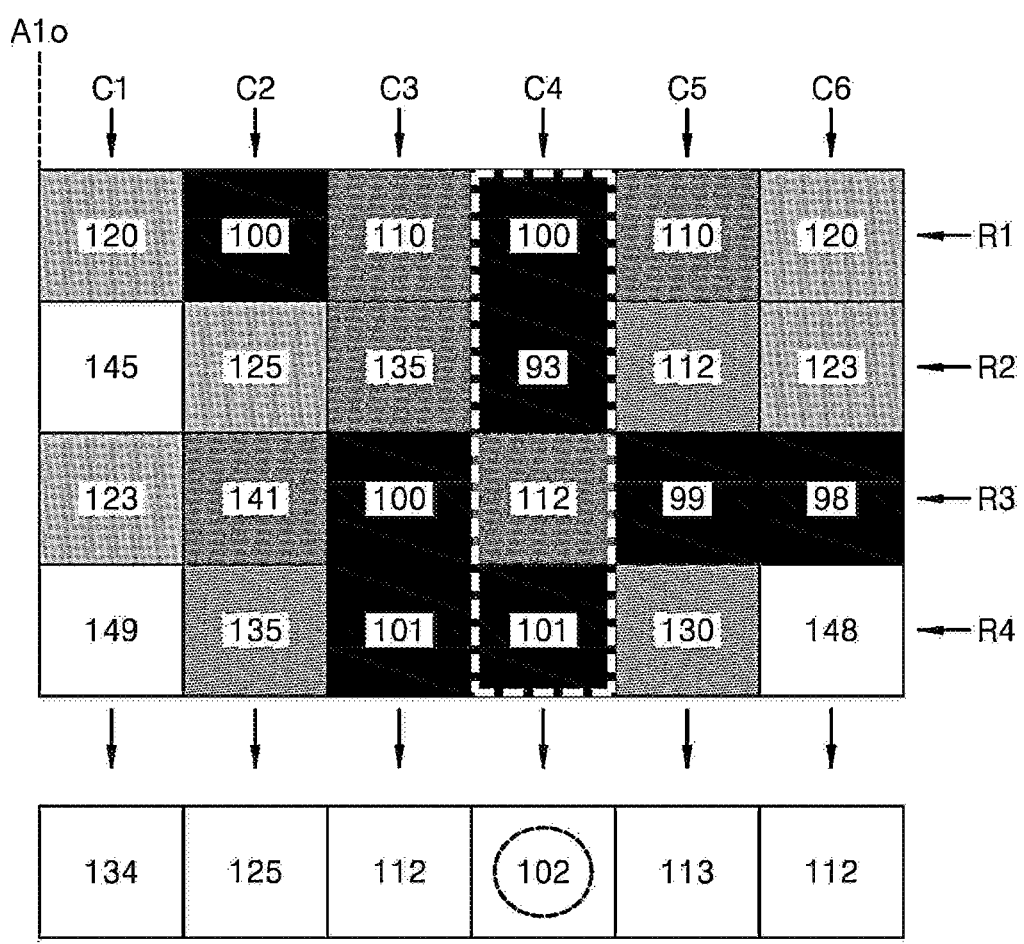
FIG. 7 is a diagram for explaining a method of generating a reference line, according to an alternative embodiment.

FIG. 7 is a diagram for explaining a method of generating a reference line, according to an alternative embodiment.

Referring to FIG. 7, the reference line BL parallel to the boundary 100E of the substrate 100 may be generated in the measurement area IA.

First, a preset number of pixels adjacent to the first boundary A1o between the first area A1 and the background area BG may be selected. FIG. 7 illustrates an embodiment where a 4×6 pixel matrix adjacent to the first boundary A1o is selected. Herein, the number of rows and columns of the pixel matrix is not limited thereto, and the number thereof may be variously modified or changed as desired.

Grayscale values of respective pixels constituting the pixel matrix are extracted, and an average value of grayscale values of pixels constituting each column may be calculated.

Afterwards, the reference line BL may be generated to overlap a column having the lowest average value among the columns of the pixel matrix. In an embodiment, for example, as shown in in FIG. 7, the reference line BL may be generated to overlap a fourth column having the lowest average value.

Figure 8A:
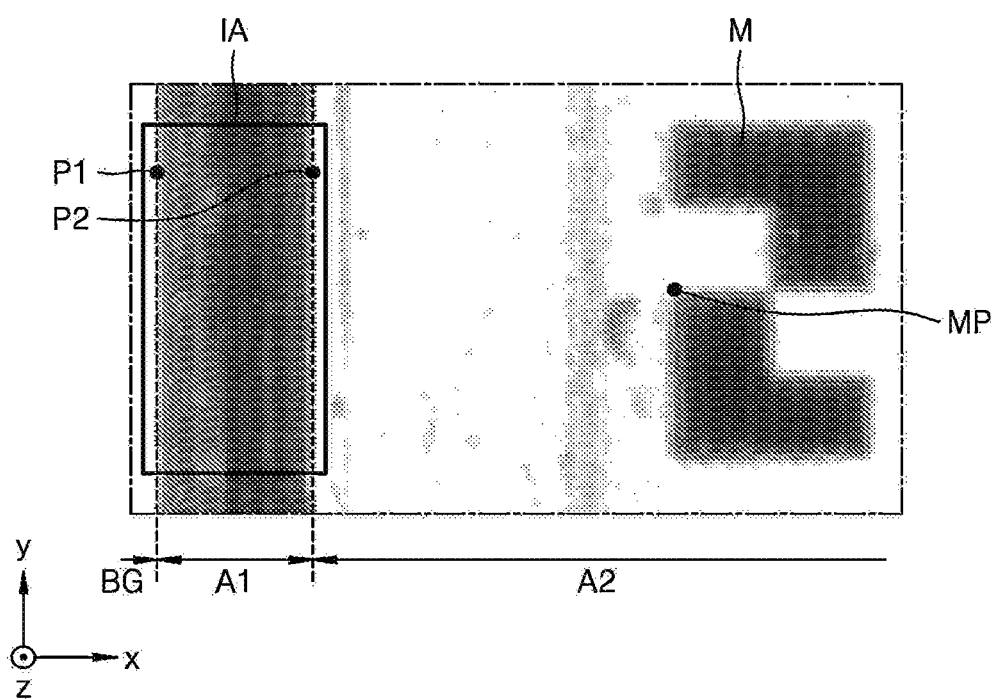
FIGS. 8A to 8C are diagrams for sequentially explaining a method of designating a plurality of detection areas within a measurement area, according to an embodiment.
Figure 8B:
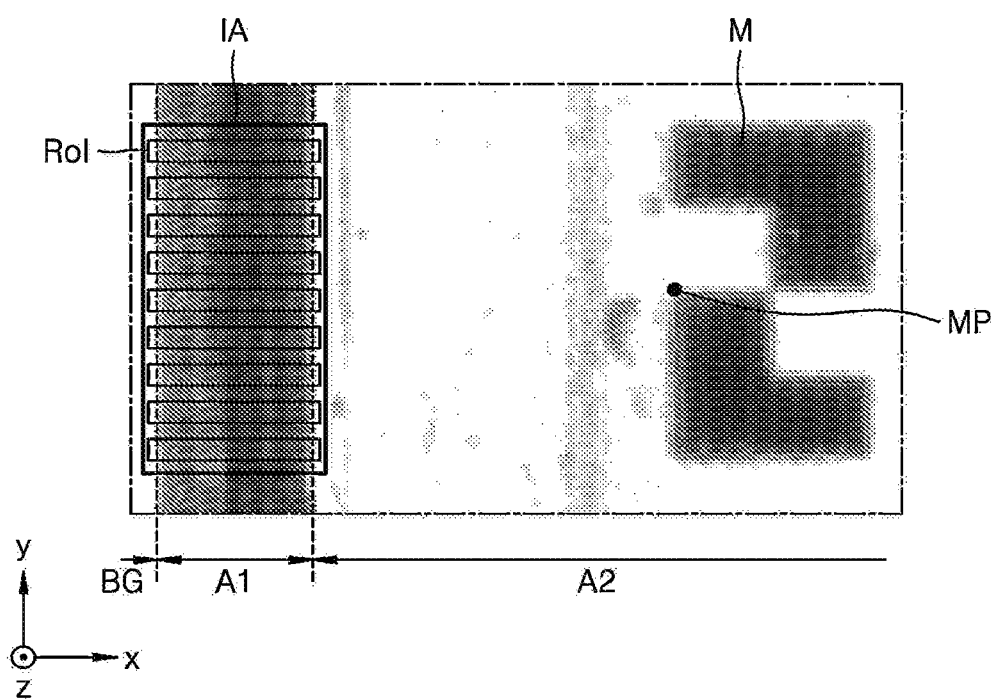
Figure 8C:
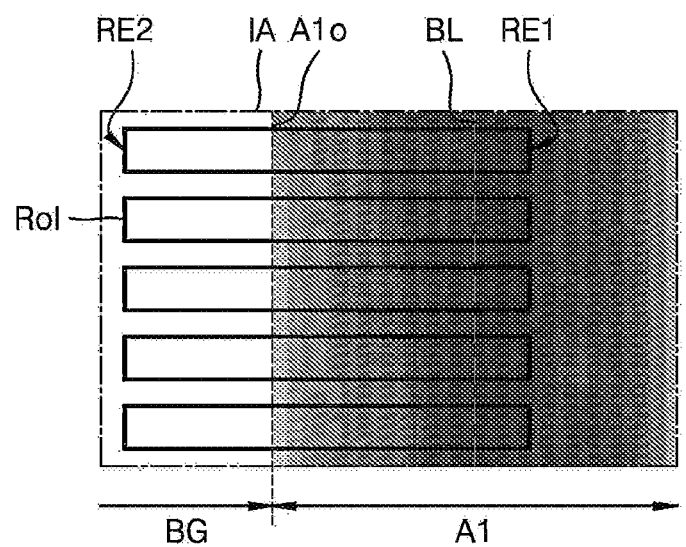

FIGS. 8A to 8C are diagrams for sequentially explaining a method of designating a plurality of detection areas within a measurement area, according to an embodiment.

Referring to FIGS. 8A to 8C, first, grayscale values of respective pixels constituting the measurement area IA are extracted to generate the plurality of detection areas RoI within the measurement area IA.

Afterwards, a first pixel P1 adjacent to the first boundary A1o of the first area A1 and a second pixel P2 adjacent to the second boundary A1i of the first area A1 may be selected from among pixels having grayscale values different from a grayscale value of a neighboring pixel by a preset value or more. In an embodiment, the preset value may be 100. In an embodiment, for example, the first pixel P1 closest to the first boundary A1o and the second pixel P2 closest to the second boundary A1i may be selected from among pixels having grayscale values different from a grayscale value of a neighboring pixel by 100 or more. A width of the detection area RoI may be determined by using coordinate values of the first pixel P1 and the second pixel P2.

FIG. 8B illustrates an embodiment where the detection areas RoI has a greater width than a difference between an x coordinate value of the first pixel P1 and an x coordinate value of the second pixel P2. In such an embodiment, the detection areas RoI may have a greater width than a width of the first area A1. Alternatively, the detection areas RoI may have a width that is smaller than or equal to the width of the first area A1.

The detection areas RoI generated in the measurement area IA may be arranged or designated to be apart from each other in a y-axis direction. The number of the detection areas RoI may be variously modified or changed as desired.

Although the width of the first area A1 may vary according to each display apparatus 1, the method of detecting the cutting line of the display apparatus according to an embodiment may shorten the time for detecting the cutting line CL by changing a width of the detection areas RoI based on coordinate values of the first pixel P1 and the second pixel P2 and reduce a detection error.

Referring to FIG. 8C, each of the generated detection areas RoI may have an inner side boundary RE1 positioned on an inner side of the first boundary A1o, and an outer side boundary RE2 facing the inner side boundary RE1 and positioned on an outer side of the first boundary A1o. The inner side boundary RE1 of the detection area RoI is a detection start position for detecting the cutting line CL, and positions of the detection areas RoI may be moved in a way such that the inner side boundary RE1 is apart from the reference line BL by a preset pixel distance.

In an embodiment, the inner side boundary RE1 of each of the detection areas RoI may be apart from the reference line BL by two pixels or three pixels, and may be at an inner side of the reference line BL. As the inner side boundary RE1 of each of the detection areas RoI is apart from the reference line BL by a preset pixel distance, even when there are a plurality of dark pixels due to the adhesive member or the like in the first area A1, a detection error of the cutting line CL may be reduced.

Figure 9:
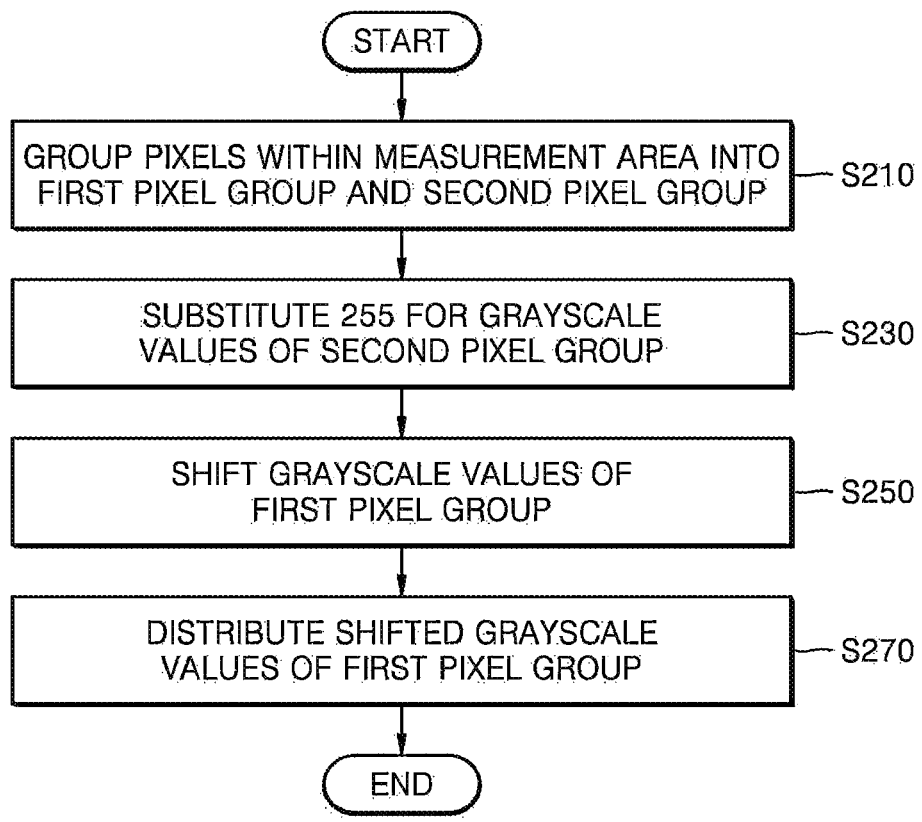
FIG. 9 is a schematic flowchart for explaining an operation of increasing a difference between grayscale values of pixels constituting a measurement area, according to an embodiment.

FIG. 9 is a schematic flowchart for explaining an operation of increasing a difference between grayscale values of pixels constituting a measurement area, according to an embodiment.

Referring to FIG. 9, a method of increasing a difference between grayscale values of pixels constituting the measurement area IA may include grouping the pixels in the measurement area IA into a first pixel group and a second pixel group (operation S210), substituting grayscale values of the second pixel group, with 255 (operation S230), shifting grayscale values of the first pixel group (operation S250), and distributing the shifted grayscale values of the first pixel group (operation S270).

Hereinafter, referring to FIGS. 10 to 12C, each operation of the method of increasing the difference between the grayscale values of the pixels constituting the measurement area IA will be described in detail.

Figure 10:
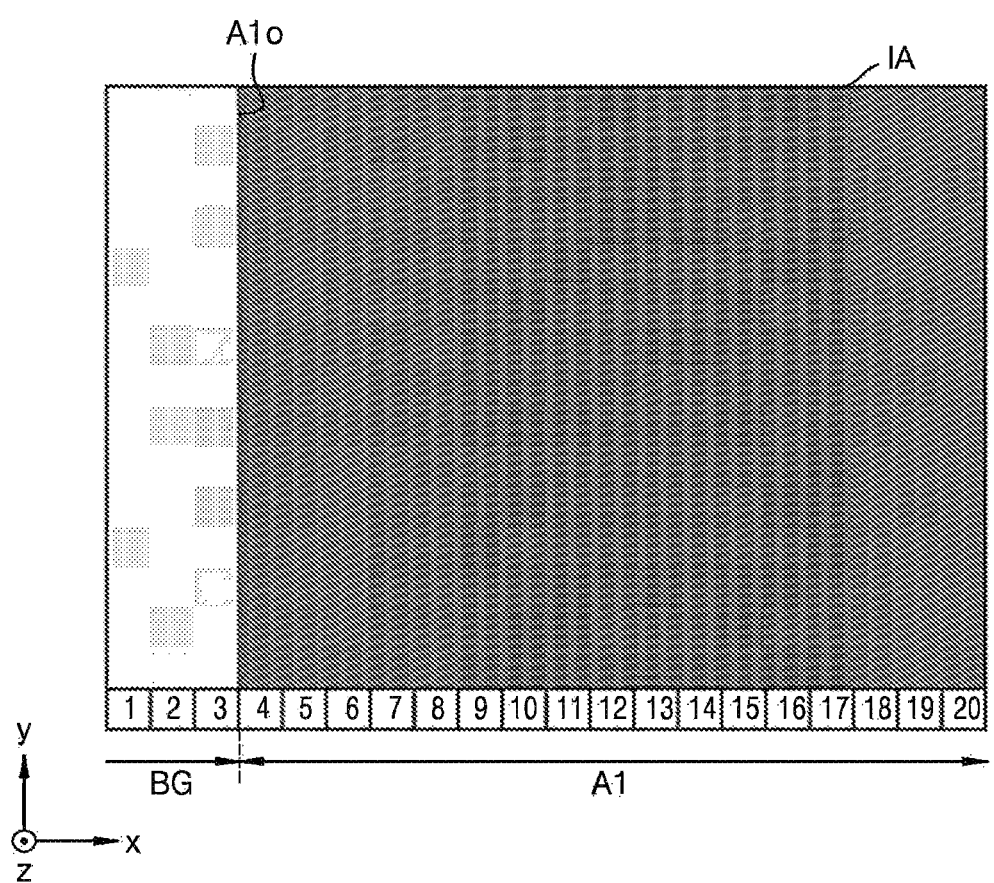
FIGS. 10 and 11 are a digital image before increasing the difference between the grayscale values and a digital image after increasing the difference between the grayscale values, respectively, for explaining the method of increasing the difference between the grayscale values of the pixels constituting the measurement area shown in FIG. 9.
Figure 11:
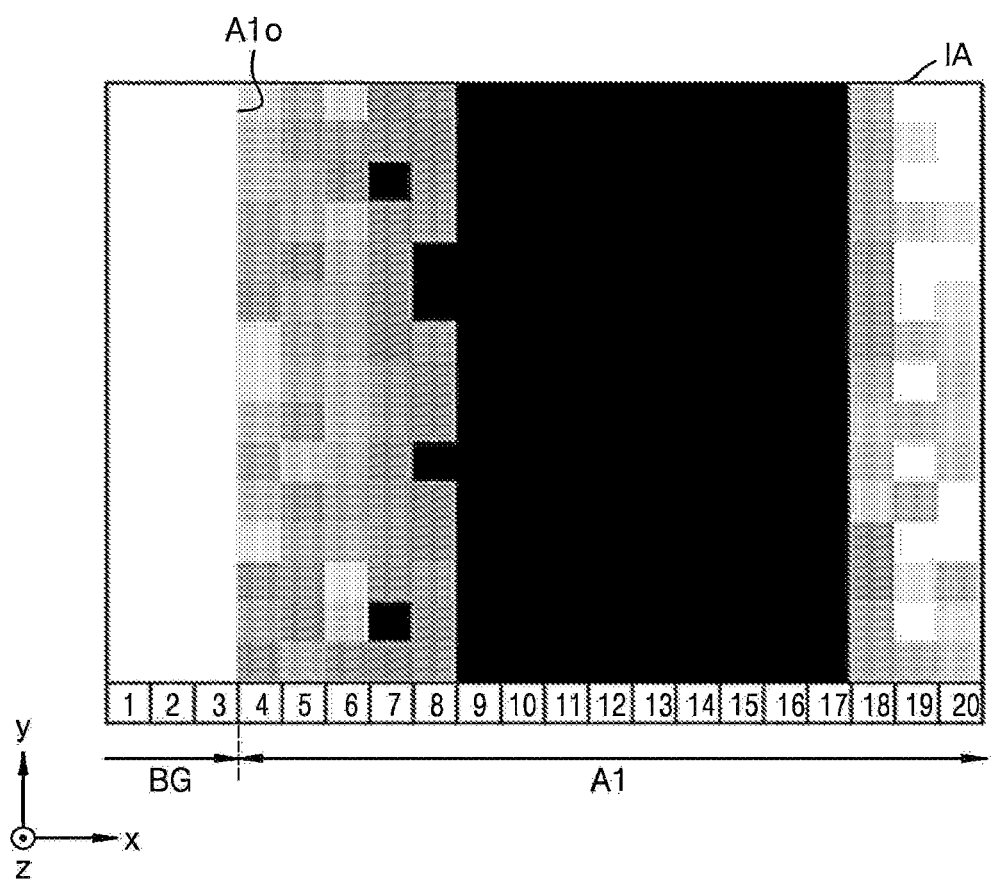

FIGS. 10 and 11 are a digital image before increasing the difference between the grayscale values and a digital image after increasing the difference between the grayscale values, respectively, for explaining the method of increasing the difference between the grayscale values of the pixels constituting the measurement area shown in FIG. 9, and FIGS. 12A to 12C are graphs for sequentially explaining the method of increasing the difference between the grayscale values of the pixels constituting the measurement area.

FIGS. 10 and 11 may each be an enlarged digital image of a portion of the measurement area IA. The digital image may include the first area A1 and the background area BG. As described above, the first area A1 may have lower grayscale values than those of the background area BG. In an embodiment, grayscale values of pixels constituting the first area A1 in the digital image may be less than or equal to 150. FIGS. 10 and 11 illustrate a case where among the pixels constituting the measurement area IA, pixels in a first column to a third column constitute the background area BG, and pixels in a fourth column to a twentieth column constitute the first area A1. In FIGS. 10 and 11, the first boundary A1o may be positioned between the third column and the fourth column.

As described above, the first area A1 may have different grayscale due to the chamfered surface of the substrate 100, the film member 200, and the adhesive member. The cutting line CL is detected by using a difference between grayscale values of any one pixel and a neighboring pixel, and thus, as shown in FIG. 10, when grayscale values of the pixels constituting the first area A1 are similar to each other, a detection error may increase or the cutting line CL may not be detected.

Therefore, as shown in FIG. 11, a difference between grayscale values of the pixels constituting the measurement area IA may be increased so that grayscale values of the pixels constituting the first area A1 are distributed over a wide range. In an embodiment, for example, in FIG. 11, a difference between pixels in an eighth column and pixels in a ninth column may be greater than or equal to 100.

Figure 12A:
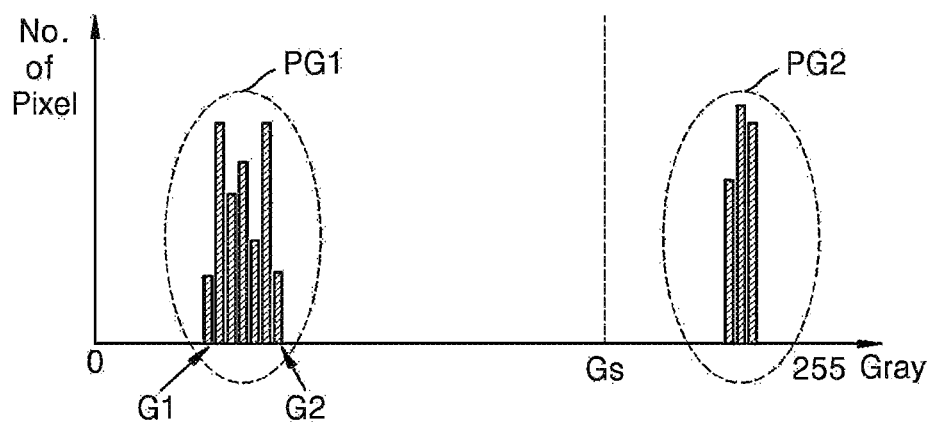
FIGS. 12A to 12C are graphs for sequentially explaining the method of increasing the difference between the grayscale values of the pixels constituting the measurement area shown in FIG. 9.

Referring to FIG. 12A, in the digital image before image processing, which increases a difference between grayscale values, the pixels constituting the measurement area IA may be grouped into a first pixel group PG1 and a second pixel group PG2.

In the digital image before image processing, grayscale values of the pixels constituting the first area A1 may be less than or equal to about 150, and grayscale values of the pixels constituting the background area BG may be greater than or equal to about 200. Based on a reference value Gs between 150 and 200, pixels having grayscale values less than or equal to the reference value Gs may be grouped into the first pixel group PG1, and pixels having grayscale values greater than the reference value Gs may be grouped into the second pixel group PG2. Therefore, the pixels constituting the first area A1 may be grouped into the first pixel group PG1, and the pixels constituting the background area BG may be grouped into the second pixel group PG2.

Afterwards, the grayscale values of the pixels included in the second pixel group PG2 may be substituted with 255. In an embodiment, the grayscale values of the pixels constituting the background area BG are substituted with 255, and thus, a shadow due to noise may be removed from the background area BG.

Figure 12B:
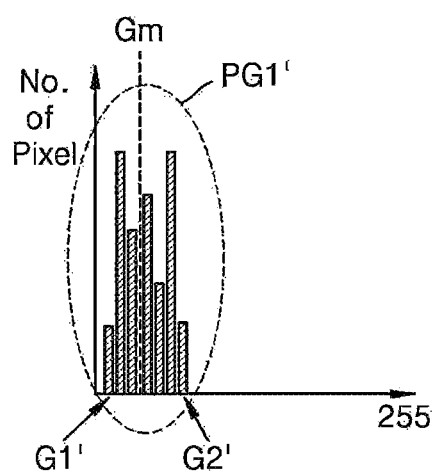

Referring to FIG. 12B, the grayscale values of the pixels included in the first pixel group PG1 may be shifted in a negative direction. In an embodiment, for example, when the smallest grayscale value of the first pixel group PG1 is G1 and the largest grayscale value thereof is G2, and the smallest grayscale value of a shifted first pixel group PG1' is G1' and the largest grayscale value thereof is G2', G1' is the sum of G1 and a shift value, G2' is the sum of G2 and the shift value, and the shift value may be a negative integer.

In an embodiment, the shift value may be obtained by subtracting 255 from G2 and adding a first value of 20 or less. The shift value may be adjusted so that G1' which is the smallest grayscale value of the shifted first pixel group PG1' has a positive value.

Figure 12C:
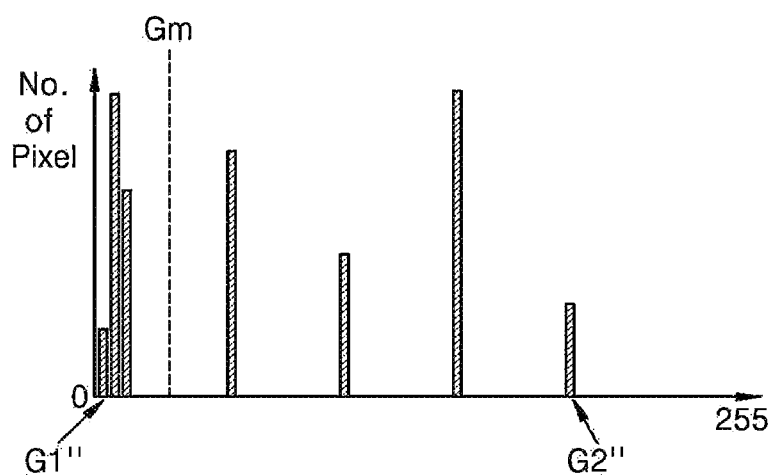

Referring to FIG. 12C, grayscale values of the pixels included in the shifted first pixel group PG1' may be distributed.

In an embodiment, the grayscale values of the respective pixels included in the shifted first pixel group PG1' may each be substituted with a distributed grayscale value satisfying the following Equation 1.

$$G'' = \frac{(N_s - 1)}{(N_p - 1)} \times E \qquad \text{[Equation 1]}$$

In Equation 1, G" denotes a distributed grayscale value of any one pixel belonging to the first pixel group PG1, $N_s$ denotes the number of pixels having grayscale values less than or equal to the grayscale value of the any one pixel, $N_p$ denotes a total number of the pixels constituting the measurement area IA, and E denotes a gain value. The gain value may be an integer of 255 or more.

Pixels having grayscale values less than or equal to a median value Gm in the shifted first pixel group PG1' may converge to a grayscale value close to zero in a distributed first pixel group PG1". Pixels having grayscale values greater than or equal to the median value Gm in the shifted first pixel group PG1' may be distributed over a wide range in the distributed first pixel group PG1" via the distribution of the grayscale values, dark areas become darker and bright areas become brighter, thereby maximizing a contrast ratio of a desired area.

In an alternative embodiment, a grayscale value of any one pixel among the pixels included in the shifted first pixel group PG1' may be substituted with a distributed grayscale value satisfying the following Equation 2.

$$G'' = \left\{ \left[ N_s + \left[ N_s \times \frac{(Ng)}{(N_p - N_g)} \right] - 1 \right] \div [N_P - 1] \right\} \times E \qquad \text{[Equation 2]}$$

In Equation 2, G" denotes a distributed grayscale value of any one pixel belonging to the first pixel group PG1, $N_s$ denotes the number of pixels having grayscale values less than or equal to the grayscale value of the any one pixel, $N_p$ denotes a total number of the pixels constituting the measurement area IA, $N_g$ denotes a total number of the pixels belonging to the second pixel group PG2, and E denotes a gain value.

Equation 2 may remove an effect caused by a large difference between grayscale values of the background area BG and the first area A1 when the background area BG is included in the measurement area IA, thereby further increasing a difference between grayscale values of the pixels constituting the first area A1.

Figure 13:
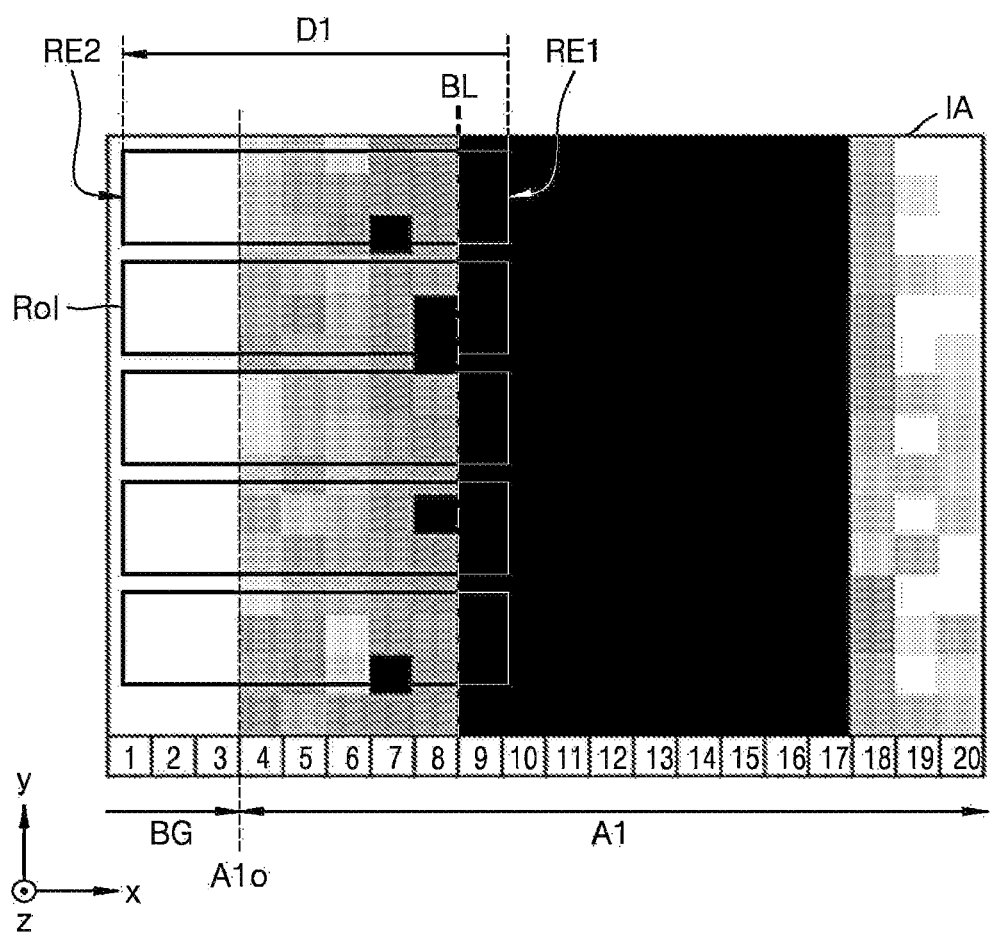
FIG. 13 is a diagram for explaining a method of determining cutting points in respective detection areas, according to an embodiment.

FIG. 13 is a diagram for explaining a method of determining cutting points in respective detection areas, according to an embodiment.

Referring to FIG. 13, the detection area RoI that has moved on the basis of the reference line BL is brought into the measurement area IA on which image processing for distributing grayscale values has been performed to select cutting points in the respective detection areas RoI. Afterwards, grayscale values of respective pixels constituting each detection area RoI may be extracted. An average value of grayscale values of pixels constituting the same column within one detection area RoI may be calculated.

A difference between average values of neighboring columns in a first direction D1 from the inner side boundary RE1 of the detection area RoI to the outer side boundary RE2 thereof may be sequentially calculated.

A cutting point of the corresponding detection area RoI may be determined or selected, where the cutting point is positioned between columns in which the calculated difference between the average values is less than or equal to a preset score value. Herein, the score value may be a negative number.

The cutting line CL may be detected by connecting at least some (or at least two) of the cutting points selected in the respective detection areas RoI. In an embodiment, among the selected cutting points, cutting points that deviate from other cutting points by a certain pixel distance or more may be excluded. The number of cutting points to be excluded may be selected by a user. The cutting line CL is made by connecting finally selected cutting points, and the cutting line CL may be formed parallel to a boundary line ML (see FIG. 14) of the reference mark M.

Figure 14:
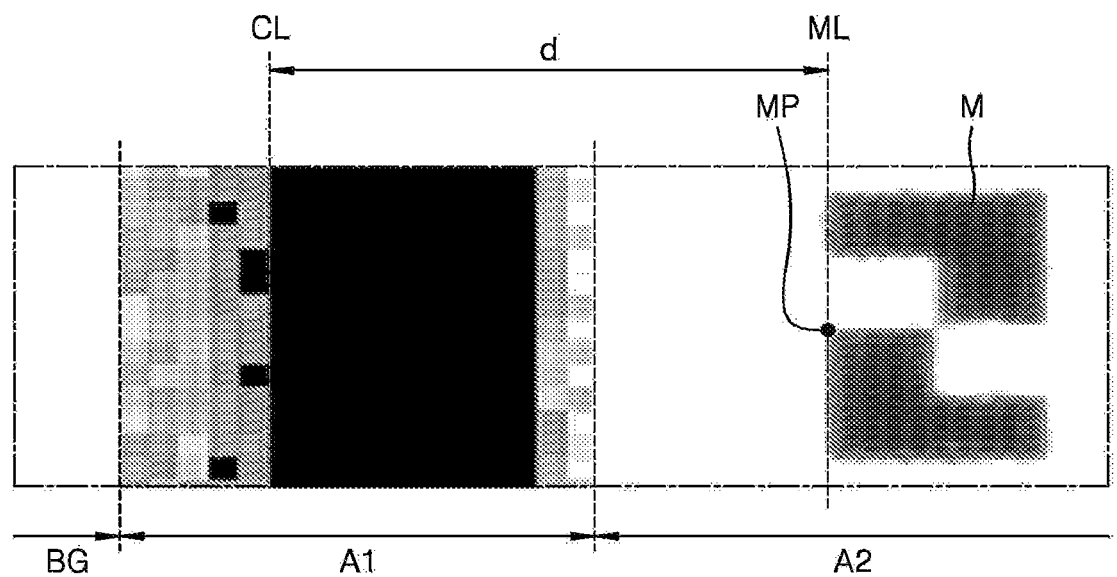
FIG. 14 is a diagram for explaining a method of measuring a distance between a cutting line and a reference mark, according to an embodiment.

FIG. 14 is a diagram for explaining a method of measuring a distance between a cutting line and a reference mark, according to an embodiment.

Referring to FIG. 14, the boundary line ML of the reference mark M may be positioned along a boundary of the reference mark M. In an embodiment, the boundary line ML of the reference mark M may pass through the reference point MP of the reference mark M.

Through image processing for distributing grayscale values of the pixels constituting the first area A1, a difference between grayscale values of the area turned black by the heat of a laser and the other areas may increase in the first area A1. The cutting line CL may be parallel to the boundary line ML of the reference mark M.

Whether the film member 200 of the display apparatus 1 is cut into a desired shape may be checked by measuring the distance d between the cutting line CL and the reference point MP of the reference mark M. When the distance d between the cutting line CL and the reference point MP of the reference mark M is out of a certain range, the corresponding display apparatus 1 may be determined to be defective.

FIGS. 15A to 15D are diagrams for sequentially explaining a method of restoring the shape of a reference mark, according to an embodiment.

Figure 15A:
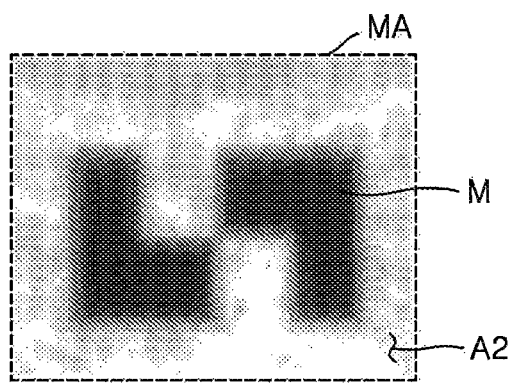
FIGS. 15A to 15D are diagrams for sequentially explaining a method of restoring the shape of a reference mark, according to an embodiment.

Referring to FIG. 15A, the reference mark M may have a blurred boundary in a captured digital image according to an image capturing environment of the display apparatus 1 and a state of the substrate 100.

For example, in a mark-surrounding area MA, it may be difficult to recognize the shape of the reference mark M because a shadow of the second area A2 generated by noise and the like and the boundary of the reference mark M have similar grayscale values. Therefore, the shape of the reference mark M may be restored before the distance d between the cutting line CL and the reference mark M is measured.

Figure 15B:
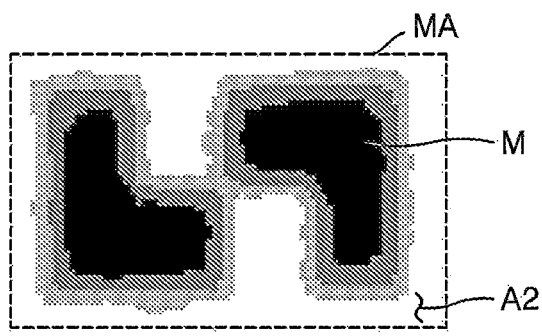

Referring to FIG. 15B, image processing for increasing a difference between grayscale values of the pixels constituting the measurement area IA may be extended to the mark-surrounding area MA. Alternatively, the same image processing may be performed on the mark-surrounding area MA.

Through the image processing, grayscale values of the pixels constituting the second area A2 included in the mark-surrounding area MA may be substituted with 255.

Figure 15C:
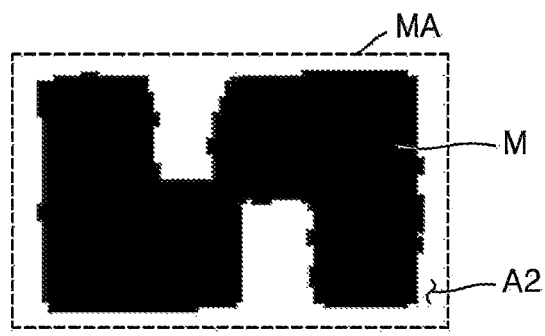

Referring to FIG. 15C, a shape similar to that of the reference mark M may be obtained by substituting grayscale values of pixels having grayscale values less than or equal to a preset value in the mark-surrounding area MA, with zero (0), and substituting grayscale values of pixels having grayscale values greater than or equal to the preset value, with 255.

Figure 15D:
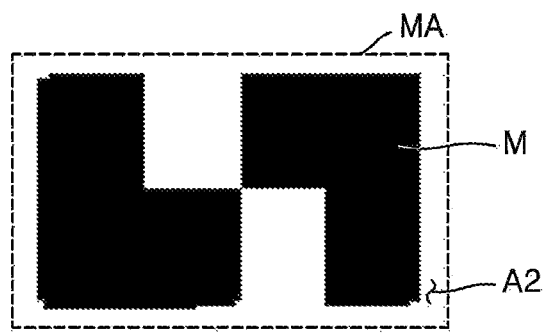

Referring to FIG. 15D, the shape of the reference mark M may be restored by increasing or decreasing the number of pixels having a grayscale value of zero (0) in the mark-surrounding area MA based on the known size and shape of the reference mark M.

By restoring the shape of the reference mark M, the boundary line ML of the reference mark M serving as a reference of an extension direction of the cutting line CL may be extracted. Alternatively, whether the display apparatus 1 is defective may be determined by further accurately measuring the distance d between the cutting line CL and the reference mark M.

According to embodiments as described above, a method of detecting a cutting line of a display apparatus, by which a detection error of the cutting line is reduced, may be implemented. However, the invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of detecting a cutting line of a display apparatus, the method comprising:
   recognizing a reference mark from a captured image of the display apparatus including a first area extending along a boundary of a substrate of the display apparatus, a second area positioned on an inner side of the first area, and a background area positioned on an outer side of the first area;
   designating a measurement area in the captured image to be apart from the reference mark by a preset distance toward the boundary of the substrate;
   generating a reference line parallel to the boundary of the substrate, within the measurement area;
   generating a plurality of detection areas within the measurement area;
   increasing a difference between grayscale values of pixels constituting the measurement area;
   determining cutting points in each of the plurality of detection areas, and detecting the cutting line based on the cutting points; and measuring a distance between the cutting line and the reference mark.

2. The method of claim 1, wherein the generating the reference line comprises:
selecting a pixel matrix of a preset size adjacent to a first boundary between the first area and the background area;
extracting grayscale values of respective pixels included in the pixel matrix;
selecting a pixel having a value closest to a preset grayscale value from each row of the pixel matrix; and
generating the reference line overlapping a column in which a largest number of pixels is selected among columns of the pixel matrix.

3. The method of claim 1, wherein the generating the reference line comprises:
selecting a pixel matrix of a preset size adjacent to a first boundary between the first area and the background area;
extracting grayscale values of respective pixels constituting the pixel matrix;
calculating an average value of grayscale values of each column of the pixel matrix; and
generating the reference line overlapping a column having a lowest average value among columns of the pixel matrix.

4. The method of claim 1, wherein the generating the plurality of detection areas within the measurement area comprises:
determining a width of the plurality of detection areas based on a width of the first area;
generating the plurality of detection areas overlapping the first area, within the measurement area; and
moving positions of the plurality of detection areas in a way such that an inner side boundary of the plurality of detection areas is apart from the reference line by a preset pixel distance.

5. The method of claim 4, wherein the determining the width of the plurality of detection areas comprises:
extracting grayscale values of respective pixels constituting the measurement area;
selecting a first pixel adjacent to a first boundary of the first area and a second pixel adjacent to a second boundary of the first area from among pixels having grayscale values different from a grayscale value of a neighboring pixel by a preset value or more; and
determining the width of the detection areas, based on coordinate values of the first pixel and the second pixel.

6. The method of claim 1, wherein the increasing the difference between the grayscale values of the pixels constituting the measurement area comprises:
grouping the pixels constituting the measurement area into a first pixel group having grayscale values less than or equal to a reference value and a second pixel group having grayscale values greater than the reference value, by extracting grayscale values of the respective pixels constituting the measurement area;
substituting the grayscale values of the pixels included in the second pixel group, with 255;
shifting the respective grayscale values of the pixels included in the first pixel group; and
distributing the shifted grayscale values of the pixels included in the first pixel group.

7. The method of claim 6, wherein the shifting the grayscale values of the pixels included in the first pixel group comprises adding a shift value to each of the grayscale values of the pixels included in the first pixel group, wherein the shift value is obtained by subtracting 255 from a largest value among the grayscale values of the pixels included in the first pixel group and adding a first value of 20 or less.

8. The method of claim 6, wherein the distributing the shifted grayscale values of the pixels included in the first pixel group comprises substituting each of the shifted grayscale values of the respective pixels included in the first pixel group with a distributed grayscale value satisfying the following equation:

$$G'' = \frac{(N_s - 1)}{(N_p - 1)} \times E,$$

wherein
G" denotes a distributed grayscale value of any one pixel belonging to the first pixel group,
$N_s$ denotes a number of pixels having grayscale values less than or equal to the grayscale value of the any one pixel,
$N_p$ denotes a total number of the pixels constituting the measurement area, and
E denotes a gain value.

9. The method of claim 6, wherein the distributing the shifted grayscale values of the pixels included in the first pixel group comprises substituting each of the shifted grayscale values of the respective pixels included in the first pixel group with a distributed grayscale value satisfying the following equation:

$$G'' = \left\{ \left[ N_s + \left[ N_s \times \frac{(Ng)}{(N_p - N_g)} \right] - 1 \right] \div [N_P - 1] \right\} \times E,$$

wherein
G" denotes a distributed grayscale value of any one pixel belonging to the first pixel group,
$N_s$ denotes a number of pixels having grayscale values less than or equal to the grayscale value of the any one pixel,
$N_p$ denotes a total number of the pixels constituting the measurement area,
$N_g$ denotes a total number of the pixels belonging to the second pixel group, and
E denotes a gain value.

10. The method of claim 1, wherein the determining the cutting points in the respective detection areas, and the detecting the cutting line based on the cutting points comprise:
extracting grayscale values of respective pixels constituting any one detection area among the plurality of detection areas;
calculating an average value of grayscale values of pixels constituting a same column within the any one detection area;
sequentially calculating a difference between average values of neighboring columns in a direction from an inner side boundary of the any one detection area to an outer side boundary thereof; and
determining a cutting point positioned between neighboring columns in which the difference between the average values is less than or equal to a preset score value.

11. The method of claim 10, wherein the cutting line connects at least two of the cutting points in the respective detection areas.

12. The method of claim 10, wherein the cutting line is parallel to a boundary line of the reference mark.

13. The method of claim 1, further comprising:
restoring a shape of the reference mark, between the increasing of the difference between the grayscale values of the pixels constituting the measurement area and the measuring of the distance between the cutting line and the reference mark.

14. The method of claim 13, wherein the restoring the shape of the reference mark comprises:
designating a mark area including the reference mark;
extracting grayscale values of pixels constituting the mark area;
substituting grayscale values of pixels having grayscale values less than or equal to a preset value among the pixels constituting the mark area, with 0; and
restoring the shape of the reference mark by increasing or decreasing a number of pixels having a grayscale value of 0.

* * * * *